US009862353B2

(12) United States Patent
Krawciw

(10) Patent No.: US 9,862,353 B2
(45) Date of Patent: Jan. 9, 2018

(54) VEHICLE SYSTEM AND METHOD FOR KEYLESS AUTHENTICATION AND CONTROL OF AN IGNITION SYSTEM

(71) Applicants: DENSO International America, Inc., Southfield, MI (US); DENSO CORPORATION, Kariya-shi, Aichi-ken (JP)

(72) Inventor: Julianne Krawciw, Warren, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 49 days.

(21) Appl. No.: 14/573,639

(22) Filed: Dec. 17, 2014

(65) Prior Publication Data

US 2016/0176381 A1    Jun. 23, 2016

(51) Int. Cl.
| | | |
|---|---|---|
| *B60R 25/04* | (2013.01) | |
| *G07C 9/00* | (2006.01) | |
| *B60R 25/24* | (2013.01) | |
| *B60R 25/08* | (2006.01) | |
| *B60R 25/045* | (2013.01) | |

(52) U.S. Cl.
CPC ............ *B60R 25/04* (2013.01); *B60R 25/045* (2013.01); *B60R 25/083* (2013.01); *B60R 25/24* (2013.01); *G07C 9/00309* (2013.01); *G07C 2009/00547* (2013.01); *G07C 2009/00793* (2013.01); *Y10T 477/647* (2015.01)

(58) Field of Classification Search
CPC ..... B60R 25/04; B60R 25/24; B60R 25/2063; B60R 25/045; B60R 25/08; B60R 25/083; G07C 9/00309; G07C 9/00658; G07C 2009/00547; Y10T 477/647; Y10T 477/644; Y10T 477/87
See application file for complete search history.

(56) References Cited

U.S. PATENT DOCUMENTS

| | | | |
|---|---|---|---|
| 4,080,537 A | 3/1978 | Bucher | |
| 5,942,988 A | 8/1999 | Snyder et al. | |
| 6,297,567 B1 * | 10/2001 | Yano | ...................... B60R 25/04 180/287 |
| 8,548,645 B2 | 10/2013 | Long | |
| 2004/0212252 A1 * | 10/2004 | Ohtaki | .................... B60R 25/04 307/10.3 |

(Continued)

*Primary Examiner* — Dionne H Pendleton
(74) *Attorney, Agent, or Firm* — Harness, Dickey & Pierce, P.L.C.

(57) ABSTRACT

The present teachings provide for a keyless authentication system for a vehicle including a sensor, a control module, and a portable transceiver and a method of authenticating the portable transceiver. The sensor can be configured to transmit a first sensor signal when a brake or clutch pedal of the vehicle is pressed. The control module can be configured to receive the first sensor signal and to wirelessly transmit a first inquiry signal if a power plant of the vehicle is on and the control module receives the first sensor signal. The portable transceiver can be configured to receive the first inquiry signal and to wirelessly transmit a first response signal in response to receiving the first inquiry signal. The control module can be configured to receive the first response signal and to shut off the power plant of the vehicle if the first response signal is not an authorized signal.

7 Claims, 3 Drawing Sheets

(56) References Cited

U.S. PATENT DOCUMENTS

2008/0231417 A1* 9/2008 Kurpinski ........... B60R 25/2036
            340/5.72
2009/0064744 A1* 3/2009 Wang .................... B60R 25/04
            70/278.1
2013/0041560 A1  2/2013 Bongiorno et al.
2013/0151096 A1* 6/2013 Fyie et al. ............. F16H 59/08
            701/62

* cited by examiner

VEHICLE SYSTEM AND METHOD FOR KEYLESS AUTHENTICATION AND CONTROL OF AN IGNITION SYSTEM

FIELD

The present disclosure relates to a vehicle system and method for keyless authentication and control of an ignition system.

BACKGROUND

This section provides background information related to the present disclosure, which is not necessarily prior art.

Vehicles are known to include keyless ignition systems. Current keyless ignition systems can detect the presence of an authorized wireless transceiver, such as a key fob for example. When an authorized key fob is within a predetermined range, the keyless ignition system generally allows the vehicle's engine to be started with the push of an ignition button that is located in the vehicle. These keyless ignition systems allow for the starting and operating of the vehicle without the need to insert a physical key into a traditional ignition tumbler lock.

Current keyless ignition systems authenticate the key fob when an operator presses the ignition button. When the ignition button is pressed, the keyless ignition system sends out a wireless inquiry signal. Key fobs that receive and recognize the inquiry signal can respond by sending a wireless response signal. The inquiry and response signals typically include an inquiry code and a response code. If the keyless ignition system does not receive a response signal that includes an authorized response code, then the keyless ignition system will not start the vehicle's engine. If the keyless ignition system does receive a response signal with an authorized response code, then the keyless ignition system will start the vehicle's engine. Once the key fob has been properly authenticated and the vehicle is running, the operator is free to drive the vehicle away from its current location.

Current keyless ignition systems only authenticate the key fob once, in order to start the vehicle. Once the vehicle is running, the vehicle is free to be driven away without the key fob being present in the vehicle. Once the vehicle is turned off, the key fob will again need to be authenticated before the vehicle can be restarted. This situation can result in the operator becoming stranded far from the key fob if the operator had started the vehicle then accidentally left the key fob outside of the vehicle before driving off in the vehicle. Additionally, this situation allows for anyone, such as an unauthorized user, to drive off with the vehicle once it has been started. Current keyless ignition systems fail to adequately address situations in which the vehicle is driven away without the key fob being present.

SUMMARY

This section provides a general summary of the disclosure, and is not a comprehensive disclosure of its full scope or all of its features.

The present teachings are advantageous over the authentication systems of the prior art because the present keyless authentication system uses a single controller device to electronically and wirelessly authenticate the presence of an authorized portable transceiver, without the need for any physical authentication of a key, to unlock doors of a vehicle, start a power plant of the vehicle, and also to prevent the vehicle from subsequently being driven away without the authorized portable transceiver. The present keyless authentication system overcomes the issue of prior art systems, namely driving off without the portable transceiver, because the present keyless authentication system can shut off the vehicle power plant when a brake pedal or clutch pedal is pressed in an attempt by an operator to shift the transmission into a drivable mode.

The present teachings provide for a keyless authentication system for a vehicle including a first sensor, a control module, and a portable transceiver. The first sensor can be configured to transmit a first sensor signal when a brake pedal or clutch pedal of the vehicle is pressed. The control module can be configured to receive the first sensor signal and to wirelessly transmit a first inquiry signal if a power plant of the vehicle is on and the control module receives the first sensor signal. The portable transceiver can be configured to receive the first inquiry signal and to wirelessly transmit a first response signal in response to receiving the first inquiry signal. The control module can be configured to receive the first response signal and to shut off the power plant of the vehicle if the first response signal is not an authorized signal.

The present teachings further provide for a method of keylessly authenticating a portable transceiver of a vehicle system, the method can include transmitting from a control module a first inquiry signal when a brake pedal or clutch pedal of the vehicle is pressed and a power plant of the vehicle is on, transmitting from a portable transceiver a first response signal in response to the portable transceiver receiving the first inquiry signal, and transmitting from the control module a power plant shut off command if the control module does not receive an authorized first response signal within a predetermined time after transmitting the first inquiry signal.

The present teachings further provide for a method of keylessly authenticating a portable transceiver of a vehicle system, the method can include performing a first routine if a power plant of the vehicle is running. The first routine can include checking if a brake or clutch sensor is activated, checking if an authorized portable transceiver is within a predetermined range if the brake or clutch sensor is activated, and shutting off the power plant if the portable transceiver is not within the predetermined range.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
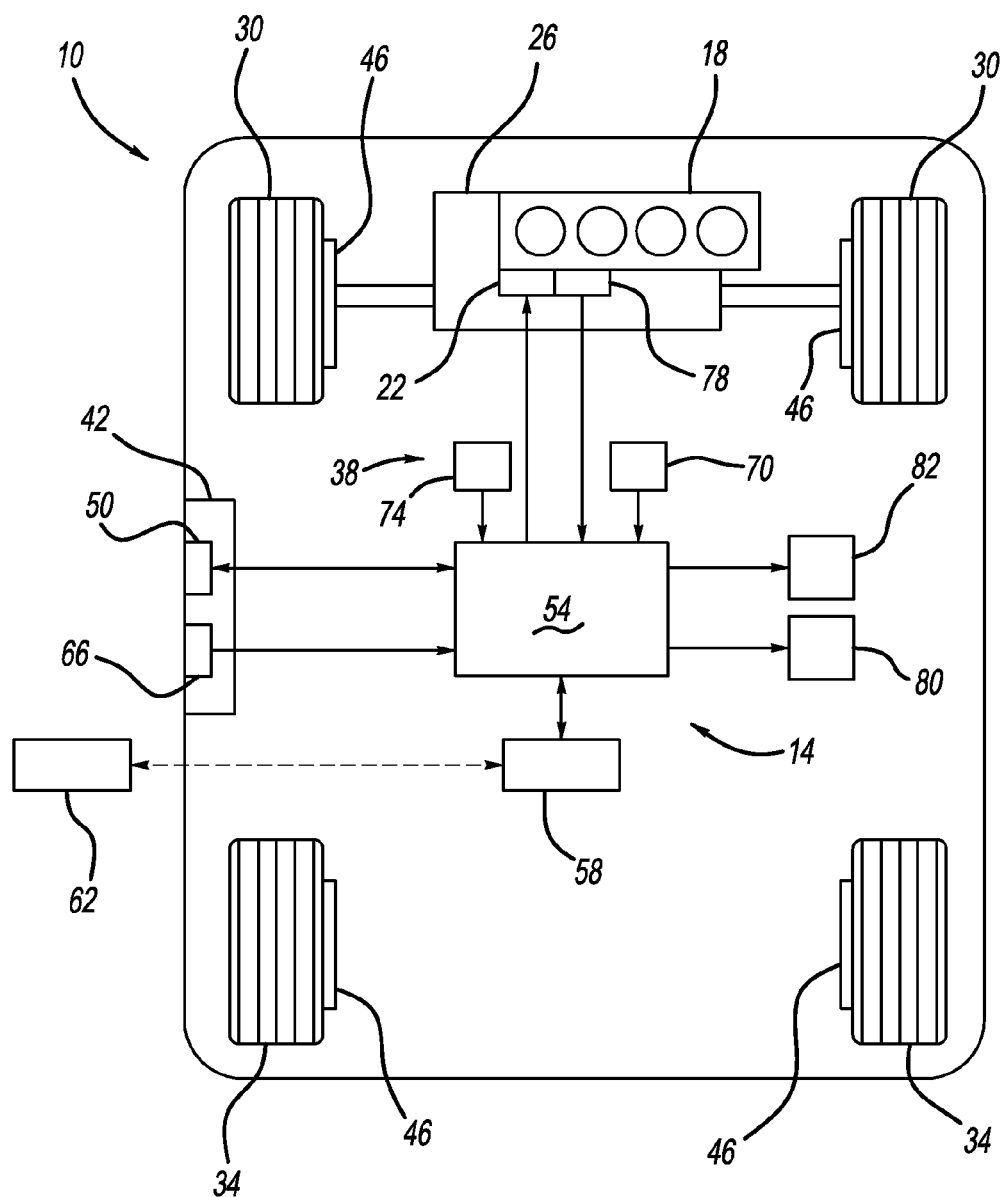
FIG. 1 is a schematic view of a vehicle and a keyless ignition system for the vehicle in accordance with the present disclosure.

With reference to FIG. 1, a vehicle 10 and a keyless authentication system 14 is schematically shown. The vehicle 10 can be any type of vehicle, such as a car, truck, commercial vehicle, recreational vehicle, agricultural vehicle, or military vehicle, for example. In the example provided, the vehicle 10 has an engine 18, an ignition system 22, a transmission 26, a pair of front wheels 30, a pair of back wheels 34, a brake or clutch system 38, and a door 42. It is understood that other types of vehicles can be used such as those with two wheels, three wheels, or more than four wheels. It is also understood that the routines described below can be used on vehicles without doors 42, as described below.

Although the vehicle 10 is shown having an internal combustion engine 18, other types of vehicle power plants can be used, such as electric motors, fuel cells, or hybrid configurations of such power plants, for example. The ignition system 22 can be any type of ignition system configured to start the engine 18, such as a starter motor (not shown), an electrical coil (not shown), and a plurality of spark plugs and wires (not shown), for example. The ignition system 22 can be configured to be electronically controlled by the keyless authentication system 14, as will be described below. The engine 18 can be coupled to the transmission 26 to provide rotary power thereto. The transmission 26 can be configured to transmit rotary power to the drive wheels, which in the example provided are the front wheels 30, though other configurations can be used. The transmission 26 can include a plurality of forward and/or reverse gears or modes and a neutral position or mode (not shown). In the case of an automatic transmission 26, a vehicle operator (not shown) can select between a plurality of modes, such as park, neutral, reverse, and drive, though other modes can be used. The modes can be selected by the vehicle operator by controlling a shift selector (not shown) located within the vehicle 10. Alternatively, or additionally, the transmission 26 can have a clutch (not shown), such as in a manual transmission for example. In the case of a manual transmission 26, the clutch can be operated to permit the operator to manually switch between the neutral position and various forward or reverse gears.

The brake or clutch system 38 can include a brake or clutch pedal (not shown), an activation system (not shown) and a plurality of brakes 46 or the clutch (not shown). The brakes 46 can be located proximate to each of the wheels 30, 34 and can be any type of brake configured to stop the vehicle 10 and hold the vehicle 10 stationary when on an incline when activated, such as drum brakes or disc brakes for example. The clutch can be located between the engine 18 and the transmission 26 and can be any type of clutch configured to selectively transmit power between the engine 18 and the transmission 26, such as a wet clutch, a dry clutch, a single plate clutch, or a multi-plate clutch for example. The brake pedal or clutch pedal can be configured to control the activation system and can be a conventional pedal to be articulated by a foot of the vehicle operator (not shown), though other configurations can be used. The activation system can be any type of activation system, such as a plurality of hydraulic components and conduits in a hydraulic system or a plurality of electrical components and electrical wires in a brake-by-wire system or a clutch-by-wire system, for example. In a hydraulic system for example, the brake or clutch pedal can be configured to increase the pressure within the hydraulic system to activate the brakes 46 or the clutch. The brake or clutch pedal can directly control the pressure in the hydraulic system, or can provide mechanical or electrical input to another component which controls the pressure, such as a hydraulic booster (not shown) for example. In the case of an automatic transmission 26, the vehicle 10 can be configured such that the transmission 26 cannot be shifted out of the park mode and/or cannot be shifted into a drivable mode (e.g. drive or reverse) without the operator pressing the brake pedal to activate the brakes 46. In the case of a manual transmission 26, the vehicle 10 can be configured such that the transmission 26 cannot be shifted out of the neutral position without the operator pressing the clutch pedal to activate the clutch.

The door 42 can be configured to permit entry into and out of the vehicle 10. While one door 42 is schematically shown, the vehicle 10 can have any number of doors 42. The door 42 can have a door lock 50 configured to selectively change between a locked state and an unlocked state to selectively lock and unlock the door 42 to permit or inhibit access to the interior of the vehicle 10. The door lock 50 can be configured to be electronically controlled by the keyless authentication system 14, as will be described below.

The keyless authentication system 14 can include a controller 54, an antenna 58, a portable transceiver 62, a door sensor 66, an ignition button 70, a brake or clutch sensor 74, an engine operation sensor 78, any number of additional sensors 80, and a warning device 82. The controller 54 can be a microprocessor unit such as an engine control unit ("ECU") for example. The controller 54 can be configured to send and receive electrical signals to various components of the vehicle 10 and the keyless authentication system 14. The controller 54 can be configured to control the operation of the ignition system 22, the door lock 50, and the antenna 58, as will be described below. The controller 54 can be configured to receive input signals from the antenna 58, door sensor 66, ignition button 70, brake or clutch sensor 74, and engine operation sensor 78, as will be described below.

The antenna 58 can be configured to wirelessly transmit electrical signals received from the controller 54. The antenna 58 can be configured to transmit wireless signals in the form of radio waves, though other types or frequencies of wireless signal transmission can be used. The wireless signal transmitted by the antenna 58 can be an authentication inquiry signal. The authentication inquiry signal can include an authentication inquiry code. The authentication inquiry code can be an encrypted code capable of being received and understood by authorized devices. It is understood that the vehicle 10 can include more than one antenna 58, such as individual, low power antennae near specific locations, or multiple antennae used to triangulate the received signals to locate their origin for example.

The portable transceiver 62 can be separate from the vehicle 10 and configured to be carried away from the vehicle 10 by the operator. The portable transceiver 62 can be any type of portable transceiver and can be configured to be easily carried by a person, such as a key fob on a key chain for example. The portable transceiver 62 can be configured to receive the wireless signals from the antenna 58 and to wirelessly transmit response signals that can be received by the antenna 58, which are then sent to the controller 54. The antenna 58 can be configured to transmit only within a predetermined range, such as within the vehicle 10, or within a predetermined distance from the vehicle 10, for example.

The controller 54 can be configured to vary the range or location of transmission depending on the particular conditions required. In this way, only portable transceivers 62 within certain ranges or locations can receive and respond to authentication inquiry signals. Additionally, or alternatively the controller 54 can be configured to differentiate between responses received from different locations or ranges, such as through signal strength, GPS data, or triangulation for example. In this way, the controller 54 can differentiate between authentication response signals received from different portable transceivers.

The door sensor 66 can be configured to detect a person desiring to open the door 42 and to send an electrical signal to the controller 54 upon the door sensor 66 detecting such a person. The door sensor 66 can be any appropriate type of sensor, such as a proximity sensor, radar, camera, light sensor, heat sensor, touch sensor, or a physical button for example. The door sensor 66 can be activated upon the person approaching the door 42, touching a portion of the door 42, or touching or operating a door handle (not shown), for example.

The ignition button 70 can be mounted within the vehicle 10, such as on a dashboard or instrument cluster (not shown), for example. The ignition button 70 can be configured to transmit an electrical signal to the controller 54 to indicate that the operator desires to start or shut-off the engine 18. The ignition button 70 can be any type of button or sensor, such as a push button, a touch screen, or a switch, for example.

The brake or clutch sensor 74 can be configured to detect the operator pressing the brake pedal of a vehicle 10 having an automatic transmission 26, or the clutch pedal of a vehicle 10 having a manual transmission 26, to respectively apply the brakes 46 or operate the clutch, and to send an electrical signal to the controller 54 upon the brake or clutch sensor 74 detecting such application of the brakes 46 or operation of the clutch. The brake or clutch sensor 74 can be mounted to the vehicle proximate to the brake pedal or the clutch pedal to directly detect the articulation of the brake pedal or the clutch pedal. Alternatively, the brake or clutch sensor 74 can be configured to detect the application of the brakes 46 themselves or the clutch itself, or by detecting hydraulic pressure or electrical changes in the activation system, for example.

The engine operation sensor 78 can be configured to detect the operational status of the engine 18, such as being operating versus being shut-off, or in an operational mode versus in a non-operational mode. The engine operation sensor 78 can be mounted to the engine 18 or the transmission 26, for example, to detect the operational status of the engine 18. The engine operation sensor 78 can be configured to send an electrical signal to the controller 54 indicative of the operational status of the engine 18.

The additional sensors 80 can be any other type of sensor used to detect the location or physical presence of the vehicle operator in the vehicle 10. For example, the additional sensors 80 could include a weight sensor in a driver's seat. Alternatively or additionally, the additional sensor 80 could include a camera or proximity sensor to detect when the vehicle operator has entered and exited the driver's seat.

The warning device 82 can be a visual device that can be configured to provide a visual warning, such as a symbol, text, or light, to be visible by the operator, as will be described below. The warning device 82 can additionally or alternatively be an audio device configured to produce an audio signal, such as a chime, speech, or other sound, to be audible to the operator, as will be described below.

The controller 54 can be configured or programmed to perform an authentication of portable transceivers 62 to verify if an authorized portable transceiver 62 is within a predetermined range or location of the vehicle.

Figure 2:
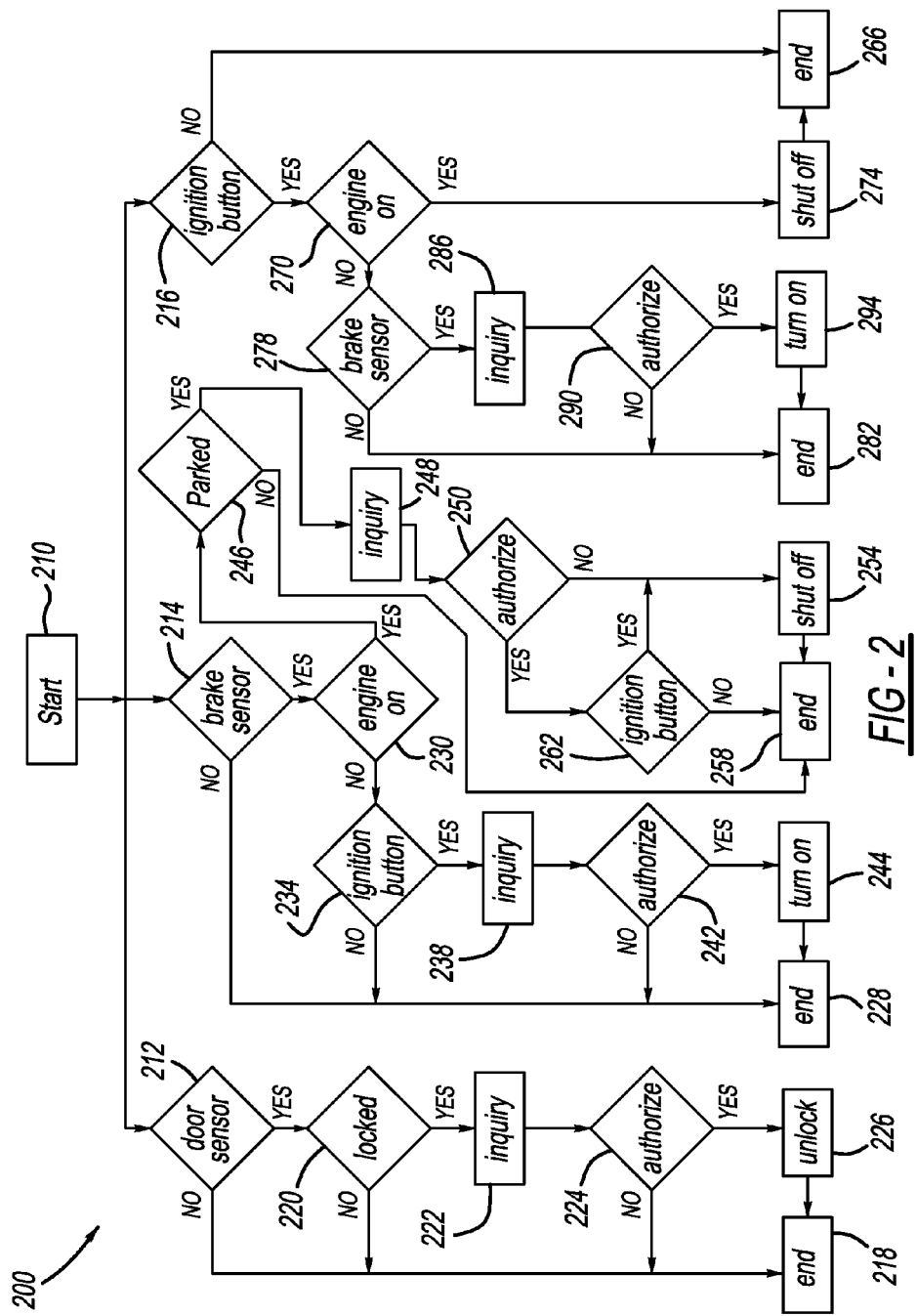
FIG. 2 is a diagram of a logic routine used by the keyless ignition system of FIG. 1 to authenticate a portable transceiver.

Operation of the keyless authentication system 14 will now be described with additional reference to FIG. 2. FIG. 2 illustrates a first logic routine 200 that can be used by the controller 54 to authenticate the portable transceiver 62. As will now be described with reference to the first routine 200 of FIG. 2, the present teachings are advantageous over the keyless authentication systems of the prior art because the present keyless authentication system 14 uses a single device, the controller 54, to wirelessly and keylessly authenticate the presence of the authorized portable transceiver 62 to unlock doors 42, start the engine 18, and also to prevent the vehicle 10 from being driven away without the authorized portable transceiver 62. The present keyless authentication system 14 overcomes the issues of driving off without the portable transceiver 62 of the keyless authentication systems of the prior art because the present keyless authentication system 14 shuts off the engine when the brake pedal or clutch pedal is pressed in an attempt to shift the transmission 26 into a drivable mode.

At step 210, the first routine 200 begins. The first routine 200 can begin periodically, after a predetermined amount of time, such that the controller 54 can periodically check the status of various sensors 66, 70, 74, of the vehicle 10, or can begin upon the controller 54 receiving an activation signal from one or more sensors 66, 70, 74 of the vehicle 10, or upon the pressing of a button (not shown) on the portable transceiver 62 or vehicle 10. In the example provided, the first routine 200 can begin when any one of the door sensor 66 (at step 212), the brake or clutch sensor 74 (at step 214), or the ignition button 70 (at step 216) is activated.

At step 212, if the controller 54 does not receive a signal from the door sensor 66 indicative of a person desiring to open the door 42, the first routine 200 proceeds to step 218. At step 218, the first routine 200 can end or return to step 210 to start again. If the controller 54 receives a signal from the door sensor 66 indicative of the person desiring to open the door 42, then the first routine 200 can proceed to step 220.

At step 220, the controller 54 can check if the door lock 50 is in the locked state. If the door lock 50 is not in the locked state, then the first routine 200 can proceed to step 218 to end or return to start at step 210, as the door 42 is already unlocked and no action needs to take place for the person to open the door 42. If the door lock 50 is in the locked state, then the first routine 200 can proceed to step 222.

At step 222, the controller 54 can transmit an authentication inquiry signal from the antenna 58 and the first routine 200 can proceed to step 224. If the portable transceiver 62 is within range of the authentication inquiry, and if the portable transceiver 62 is configured to recognize and respond to the inquiry code, then the portable transceiver can transmit an authentication response. If the antenna 58 is within range of the authentication response, then the controller 54 can analyze the authentication response and check if the response code is an authorized response code.

At step 224, if the controller 54 has not receive an authorized response code (i.e. due to the code received being an unauthorized code or the controller 54 not receiving any response code within a predetermined time), then the first routine 200 can proceed to step 218 to end or return to start at step 210. Alternatively, if an authorized response code is received, but the controller 54 determines that the portable transceiver 62 that transmitted the authorized response code is not within a predetermined range of the controller 54 or the door 42, which had its door sensor 66 activated, then the first routine 200 can also proceed to step 218 to end or return to start at step 210. For example, if the operator in possession of the authorized portable transceiver 62 is within the vehicle 10, an unauthorized person can still be denied access to the interior of the vehicle 10 when the unauthorized person attempts to activate the door sensor 66 from the exterior of the vehicle 10. If the controller 54 receives an authorized response code, then the first routine 200 can proceed to step 226 where the door lock 50 is unlocked.

At step 226, the controller 54 can send a signal to the door lock 50 to change from the locked state to the unlocked state. If the vehicle includes multiple doors 42, the controller 54 can be configured to determine the location of the authorized portable transceiver 62 and to send the unlock signal only to the door lock 50 of the door 42 proximate to the authorized portable transceiver 62. For example, if the operator in possession of the authorized portable transceiver 62 activates the door sensor 66 on a driver's side of the vehicle 10, an unauthorized person can still be denied access to the vehicle 10 when attempting to access the vehicle 10 from the passenger side. After the appropriate door lock 50 has been unlocked, the first routine 200 can proceed to step 218 to end or return to start at step 210.

Returning to check if the brake or clutch sensor 74 is activated at step 214, if the brake or clutch sensor 74 is not activated, then the first routine 200 can proceed to step 228 and can end or return to start at step 210. If the controller 54 receives a signal indicative of the brake or clutch sensor 74 being activated, then the first routine 200 can proceed to step 230. At step 230, the controller 54 can check if the engine 18 is operational, or running. If the controller 54 receives a signal from the engine operation sensor 78 indicative of the engine 18 being off or in a non-operational mode, or if the controller 54 does not receive a signal indicative of the engine 18 being operational or running, then the first routine 200 can proceed to step 234. At step 234, the controller 54 can check if the ignition button 70 is pressed.

If the ignition button 70 is not pressed (i.e. the brake is pressed, the engine is off, and the ignition button is not pressed), then the first routine 200 can proceed to step 228. At step 228, the first routine 200 can end or return to start at step 210. If the ignition button 70 is pressed (i.e. the brake is pressed, the engine is off, and the ignition is pressed), then the first routine 200 can proceed to step 238.

At step 238, the controller 54 can transmit an authentication inquiry signal from the antenna 58 and the first routine 200 can proceed to step 242. If the portable transceiver 62 is within range of the authentication inquiry, and if the portable transceiver 62 is configured to recognize and respond to the inquiry code, then the portable transceiver can transmit an authentication response signal. If the antenna 58 is within range of the authentication response signal, then the antenna 58 can receive the authentication response signal and transmit it to the controller 54. The controller 54 can then analyze the authentication response and check if the response code is an authorized response code.

At step 242, if the controller 54 does not receive an authorized response code (i.e. due to the code received being an unauthorized code or the controller 54 not receiving any response code within a predetermined time), then the first routine 200 can proceed to step 228 to end or return to start at step 210. Alternatively, if an authorized response code is received, but the controller 54 determines that the portable transceiver 62 that transmitted the authorized response code is not within a predetermined range of the controller 54 or the ignition button 70, then the first routine 200 can also proceed to step 228. For example, if the operator in possession of the authorized portable transceiver 62 is outside the vehicle 10, an unauthorized person within the vehicle 10 can still be unable to start the engine 18.

If the controller 54 receives an authorized response code, then the first routine 200 can proceed to step 244. At step 244, the controller 54 can send a signal to the ignition system 22 to start the engine 18 of the vehicle 10. After the engine 18 has been started at step 244, the first routine 200 can proceed to step 228 to end or return to start at step 210.

Returning to step 230, if the controller 54 receives a signal from the engine operation sensor 78 indicative of the engine being on or in an operational mode, then the first routine 200 can proceed to step 246. At step 246, the controller 54 can check if the vehicle 10 is parked. The controller 54 can determine that the vehicle 10 is parked in any suitable manner. For example, in the case of an automatic transmission 26, the vehicle 10 can be considered parked if the mode selector (not shown) is in the parked position or if the transmission 26 is otherwise in the parked gear or mode. For example, in the case of a manual transmission 26, the vehicle can be considered parked if a parking brake (not shown) is applied or is applied above a predetermined threshold level. In yet another example, the additional sensors 80 can detect if the operator has exited the vehicle 10 subsequent to the engine 18 being turned on. In such a scenario, where the operator has exited the vehicle 10 after the engine 18 was turned on, the vehicle 10 can be considered parked. If the vehicle 10 is not parked, then the first routine 200 can proceed to step 258 to end or return to start at step 210. If the vehicle 10 is parked, then the first routine 200 can proceed to step 248.

At step 248, the controller 54 can transmit an authentication inquiry signal from the antenna 58 and the first routine 200 can proceed to step 250. If the portable transceiver 62 is within range of the authentication inquiry, and if the portable transceiver 62 is configured to recognize and respond to the inquiry code, then the portable transceiver 62 can transmit an authentication response signal. If the antenna 58 is within range of the authentication response signal, then the antenna 58 can receive the authentication response signal and transmit it to the controller 54. The controller 54 can then analyze the authentication response and check if the response code is an authorized response code.

At step 250, if the controller 54 does not receive an authorized response code (i.e. due to the code received being an unauthorized code or the controller 54 not receiving any response code within a predetermined time), then the first routine 200 can proceed to step 254. At step 254, the controller 54 can shut off power to the ignition system 22 to shut off the engine 18 to prevent the vehicle 10 from being driven away without the authorized portable transceiver 62. The controller 54 can also send a signal to the warning device 82 to cause the warning device 82 to warn the operator or person in the vehicle 10 that the authorized portable transceiver 62 has not been appropriately detected. The warning device 82 can provide a visual warning, such as a symbol, text, or light, to indicate the absence of the portable transceiver 62. The warning device 82 can additionally or alternatively produce an audio signal, such as a chime, speech, or other sound, to indicate the absence of the portable transceiver 62. In the example provided, the controller 54 can send a signal to the ignition system 22 to control the ignition system 22 to shut off the engine 18, though other ways of shutting off the engine 18 can be used.

Alternatively, if an authorized response code is received, but the controller 54 determines that the portable transceiver 62 that transmitted the authorized response code is not within a predetermined range of the controller 54 or the brake or clutch sensor 74, then the first routine 200 can also proceed to step 254. For example, if the operator in possession of the authorized portable transceiver 62 is outside the vehicle 10, an unauthorized person within the vehicle 10 can still be unable to drive away in the vehicle 10 because, upon pressing the brake pedal or the clutch pedal to shift the transmission from a parked mode or into a drivable mode, the controller 54 will shut off the engine 18. After shutting off the engine 18 at step 254, the first routine 200 can proceed to step 258 to end or return to start at step 210.

Returning to step 250, if an authorized response code is appropriately received, then the first routine 200 can proceed to step 262. At step 262, controller 54 can check if the ignition button 70 is pressed. If the ignition button 70 is pressed, then the first routine 200 can proceed to step 254 to shut off the engine 18. After the engine has been shut off at step 254, the first routine 200 can proceed to step 258 and end or return to start at step 210. If the ignition button 70 is not pressed (i.e. the brake is pressed, the engine 18 is on, and an authorized portable transceiver 62 is appropriately present), then the first routine 200 can proceed to step 258 to end or return to start at step 210.

Returning to step 216, if the ignition button 70 is not pressed, then the first routine 200 can proceed to step 266. At step 266, the first routine 200 can end or return to start at step 210. If the controller 54 receives a signal indicative of the ignition button 70 being pressed, then the first routine 200 can proceed to step 270. At step 270, the controller 54 can check if the engine 18 is operational, or running. If the controller 54 receives a signal from the engine operation sensor 78 indicative of the engine 18 being on or in an operational mode, then the first routine 200 can proceed to step 274. At step 274, the controller 54 can shut off the engine 18. After step 274, the first routine 200 can proceed to step 266 to end or return to start at step 210.

Returning to step 270, if the controller 54 receives a signal indicative of the engine being off or non-operational, or the controller 54 does not receive a signal indicative of the engine 18 being operational or running, then the first routine 200 can proceed to step 278. At step 278, the controller 54 can check if the brake pedal or the clutch pedal is pressed. If the controller 54 does not receive a signal from the brake or clutch sensor 74 indicative that the brake pedal or the clutch pedal is pressed, then the first routine 200 can proceed to step 282. At step 282, the first routine 200 can end or return to start at step 210.

If the controller 54 receives a signal from the brake or clutch sensor 74 indicative of the brake pedal or clutch pedal being pressed, then the first routine 200 can proceed to step 286. At step 286, the controller 54 can transmit an authentication inquiry signal from the antenna 58 and the first routine 200 can proceed to step 290. If the portable transceiver 62 is within range of the authentication inquiry, and if the portable transceiver 62 is configured to recognize and respond to the inquiry code, then the portable transceiver can transmit an authentication response signal. If the antenna 58 is within range of the authentication response signal, then the antenna 58 can receive the authentication response signal and transmit it to the controller 54. The controller 54 can then analyze the authentication response and check if the response code is an authorized response code.

At step 290, if the controller 54 does not receive an authorized response code (i.e. due to the code received being an unauthorized code or the controller 54 not receiving any response code within a predetermined time), then the first routine 200 can proceed to step 282 to end or return to start at step 210. Alternatively, if an authorized response code is received, but the controller 54 determines that the portable transceiver 62 that transmitted the authorized response code is not within a predetermined range of the controller 54 or the ignition button 70, then the first routine 200 can also proceed to step 282. For example, if the operator in possession of the authorized portable transceiver 62 is outside the vehicle 10, an unauthorized person within the vehicle 10 can still be unable to start the engine 18.

If the controller 54 receives an authorized response code, then the first routine 200 can proceed to step 294. At step 294, the controller 54 can send a signal to the ignition system 22 to start the engine 18 of the vehicle 10. After the engine 18 has been started at step 294, the first routine 200 can proceed to step 282 to end or return to start at step 210.

Figure 3:
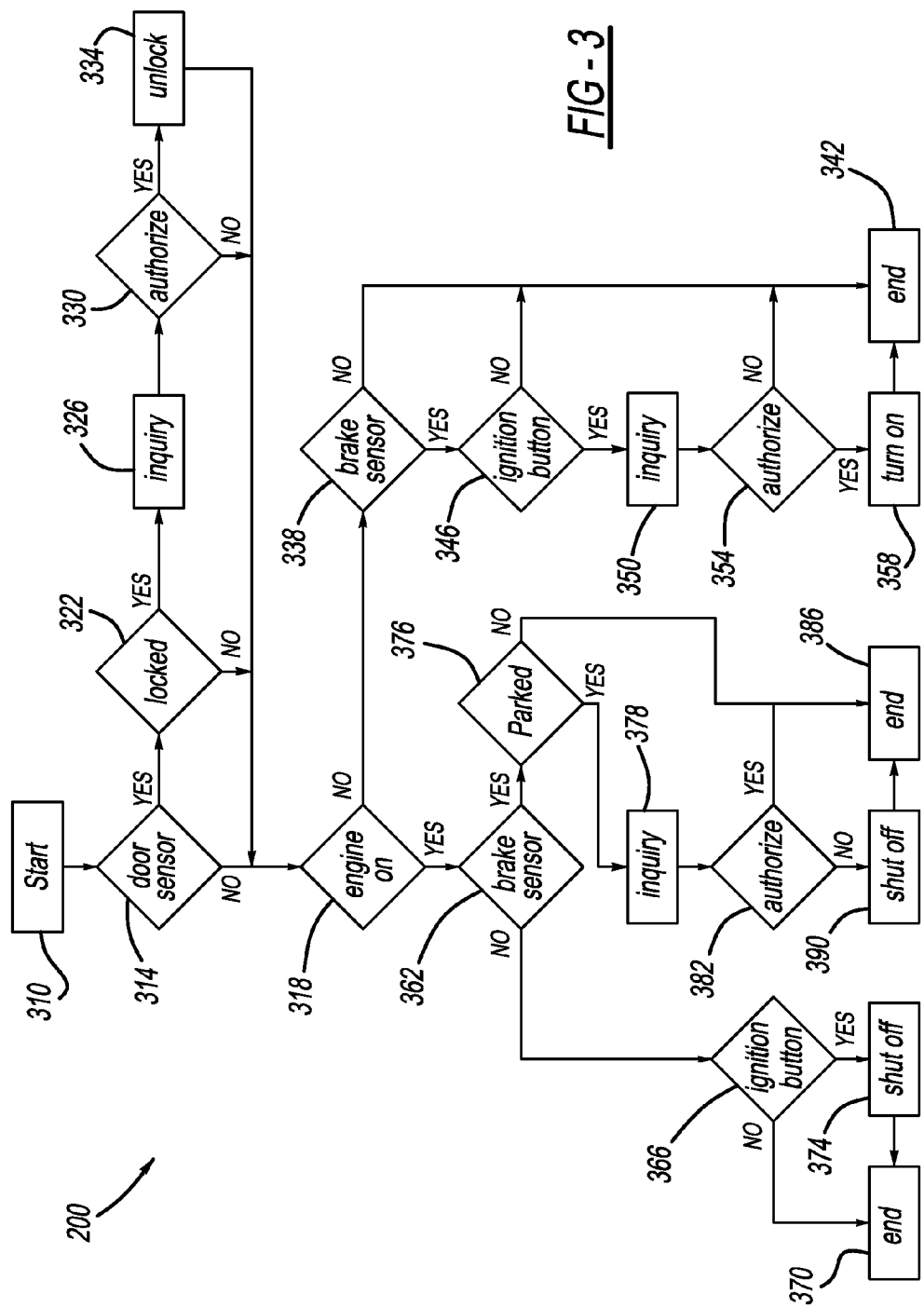
FIG. 3 is a diagram of a second logic routine that can be used by the keyless ignition system of FIG. 1 to authenticate the portable transceiver.

With reference to FIG. 3, a second logic routine 300 that can be used by the controller 54 to authenticate the portable transceiver 62 is illustrated. The second logic routine 300 can begin periodically, after a predetermined amount of time, or can begin upon the controller 54 receiving an activation signal from one or more sensors 66, 70, 74 of the vehicle 10, or upon the pressing of a button (not shown) on the portable transceiver 62 or vehicle 10. The second logic routine 300 can differ from the first logic routine 200 in that after beginning at step 310, the second logic routine 300 always proceeds to first check if the door sensor 66 is activated at step 314 before checking if the engine 18 is operational or running.

As will now be described with reference to the second routine 300 of FIG. 3, the present teachings are advantageous over the keyless authentication systems of the prior art because the present keyless authentication system 14 uses a single device, the controller 54, to wirelessly and keylessly authenticate the presence of the authorized portable transceiver 62 to unlock doors 42, start the engine 18, and also to prevent the vehicle 10 from being driven away without the authorized portable transceiver 62. The present keyless authentication system 14 overcomes the issues of driving off without the portable transceiver 62 of the keyless authentication systems of the prior art because the present keyless authentication system 14 shuts off the engine when the brake pedal or clutch pedal is pressed in an attempt to shift the transmission 26 into a drivable mode.

At step 314, the controller 54 can check if the door sensor 66 is activated similar to step 212 (FIG. 2). If the door sensor 66 is not activated, then the second routine 300 can proceed to step 318 to check if the engine 18 is operational or running similar to step 230 (FIG. 2) as described below.

If the door sensor 66 is activated, the second routine 300 can proceed to step 322. At step 322, the controller 54 can check if the door lock 50 is in the locked state similar to step 220 (FIG. 2). If the door lock 50 is not in the locked state, then the second routine 300 can proceed to step 318. If the door lock 50 is in the locked state, then the second routine 300 can proceed to step 326. At step 326, the controller 54 can transmit an authentication inquiry signal similar to step 222 (FIG. 2) and the second routine 300 can proceed to step 330. At step 330, the controller 54 can check if an authorized response signal having an authorized response code is received similar to step 224 (FIG. 2). If an authorized response code is not received, then the second routine 300 can proceed to step 318. If an authorized response code is received by the controller 54, then the second routine 300 can proceed to step 334. At step 334, the controller 54 can send a signal to the door lock 50 to change to the unlocked state, similar to step 226 (FIG. 2). After the door lock 50 changes to the unlocked state in step 334, the second routine 300 can proceed to step 318.

At step 318, the controller 54 can check if the engine 18 is running or operational similar to step 230 (FIG. 2). If the engine 18 is not running, the second routine 300 can proceed to step 338. At step 338, the controller 54 can check if the brake or clutch sensor 74 is activated, similar to step 214 (FIG. 2). If the brake or clutch sensor 74 is not activated, then the second routine 300 can proceed to step 342. At step 342, the second routine 300 can end or return to step 310.

If the brake or clutch sensor 74 is activated, then the second routine 300 can proceed to step 346. At step 346, the controller 54 can check if the ignition button 70 is pressed, similar to step 234 (FIG. 2). If the ignition button 70 is not pressed, then the second routine 300 can proceed to step 342. If the ignition button 70 is pressed, then the second routine 300 can proceed to step 350.

At step 350, the controller 54 can transmit an authentication inquiry signal similar to step 238 (FIG. 2) and the second routine 300 can proceed to step 350. At step 350, the controller 54 can check if an authorized response signal having an authorized response code is received similar to step 242 (FIG. 2). If an authorized response code is not received, then the second routine 300 can proceed to step 342. If an authorized response code is received by the controller 54, then the second routine 300 can proceed to step 358. At step 358, the controller 54 can send a signal to the ignition system 22 to start the engine 18, similar to step 244 (FIG. 2). After the engine 18 is started in step 358, the second routine 300 can proceed to step 342.

Returning to step 318, if the controller 54 receives a signal indicative of the engine 18 running, then the second routine 300 can proceed to step 362. At step 362, the controller 54 can check if the brake or clutch sensor 74 is activated, similar to step 214 (FIG. 2). If the brake or clutch sensor 74 is not activated, then the second routine 300 can proceed to step 366. At step 366, the controller 54 can check if the ignition button 70 is pressed, similar to step 216 (FIG. 2). If the ignition button 70 is not pressed, then the second routine 300 can proceed to step 370. At step 370, the second routine 300 can end or return to step 310. If the ignition button 70 is pressed, then the second routine 300 can proceed to step 374. At step 374, the controller 54 can shut off the engine 18 similar to step 274 (FIG. 2). After step 374, the second routine 300 can proceed to step 370.

Returning to step 362, if the controller 54 receives a signal indicative of the brake or clutch sensor 74 being activated, then the second routine 300 can proceed to step 376. At step 376, the controller 54 can check if the vehicle 10 is parked similar to step 246 (FIG. 2). If the vehicle 10 is not parked, then the second routine 300 can proceed to step 386 to end or return to step 310. If the vehicle 10 is parked, the second routine 300 can proceed to step 378.

At step 378, the controller 54 can transmit an authentication inquiry signal similar to step 248 (FIG. 2) and the second routine 300 can proceed to step 382. At step 382, the controller 54 can check if an authorized response signal having an authorized response code is received similar to step 250 (FIG. 2). If an authorized response code is received by the controller 54, then the second routine 300 can proceed to step 386. At step 386, the second routine 300 can end or return to step 310. If an authorized response code is not received, then the second routine 300 can proceed to step 390. At step 390, the controller 54 can shut off the engine 18, similar to step 254 (FIG. 2). At step 390, the controller 54 can also send a signal to the warning device 82 to display and/or sound a warning that the authorized portable transceiver 62 has not been properly authenticated. After the engine 18 is shut off in step 390, the second routine 300 can proceed to step 386 to end or return to step 310.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A keyless authentication system for a vehicle comprising:
   a first sensor configured to transmit a first sensor signal when a brake or clutch pedal of the vehicle is pressed and a power plant of the vehicle is already on;
   a control module configured to receive the first sensor signal and to wirelessly transmit a first inquiry signal when the power plant of the vehicle is on and the control module receives the first sensor signal; and
   a portable transceiver configured to receive the first inquiry signal and to wirelessly transmit a first response signal in response to receiving the first inquiry signal;
   wherein the control module is configured to receive the first response signal and to shut off the power plant of the vehicle if the first response signal is not an authorized signal.

2. The keyless authentication system of claim 1, further comprising a second sensor configured to transmit a second sensor signal to the control module when an ignition button is activated;
   wherein the control module is configured to wirelessly transmit a second inquiry signal when the control module receives the first and second sensor signals and the power plant is off, wherein the portable transceiver is configured to receive the second inquiry signal and to wirelessly transmit a second response signal in response to receiving the second inquiry signal, and wherein the control module is configured to start the power plant of the vehicle if the second response signal is an authorized signal.

3. The keyless authentication system of claim 2, wherein the control module is configured to shut off the power plant when the control module receives the second sensor signal and the power plant is on.

4. The keyless authentication system of claim 1, further comprising a third sensor configured to transmit a third sensor signal to the control module;
   wherein the control module is configured to wirelessly transmit a third inquiry signal when the control module receives the third sensor signal, wherein the portable transceiver is configured to receive the third inquiry signal and to wirelessly transmit a third response signal in response to receiving the third inquiry signal, and wherein the control module is configured to unlock a door of the vehicle if the third response signal is an authorized signal.

5. The keyless authentication system of claim 4, wherein the third sensor is mounted to a first door of the vehicle and the control module is configured to unlock the first door and not a second door of the vehicle when the control module receives the third response signal and the third response signal is an authorized signal.

6. The keyless authentication system of claim 1, wherein the control module is configured to display a visual warning if the first response signal is not an authorized signal.

7. The keyless authentication system of claim 1, wherein the control module is configured to produce an audio warning if the first response signal is not an authorized signal.

* * * * *